(12) United States Patent
Armitage et al.

(10) Patent No.: US 12,523,301 B2
(45) Date of Patent: Jan. 13, 2026

(54) SEAL AND METHOD OF USING AND MAKING THE SAME

(71) Applicant: SAINT-GOBAIN PERFORMANCE PLASTICS CORPORATION, Solon, OH (US)

(72) Inventors: Mark W. Armitage, Madison, CT (US); Dallas J. Conway, Clinton, CT (US)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 119 days.

(21) Appl. No.: 18/240,899

(22) Filed: Aug. 31, 2023

(65) Prior Publication Data

US 2024/0068573 A1     Feb. 29, 2024

Related U.S. Application Data

(60) Provisional application No. 63/374,041, filed on Aug. 31, 2022.

(51) Int. Cl.
    *F16J 15/3284*     (2016.01)
(52) U.S. Cl.
    CPC ................ *F16J 15/3284* (2013.01)
(58) Field of Classification Search
    CPC .................................. F16J 15/3284
See application file for complete search history.

(56) References Cited

U.S. PATENT DOCUMENTS

| | | | |
|---|---|---|---|
| 2,538,198 A | * | 1/1951 | Hosford ............. F16J 15/328 |
| | | | 277/572 |
| 3,469,850 A | | 9/1969 | Jackson et al. |
| 4,304,426 A | | 12/1981 | Francis |

(Continued)

FOREIGN PATENT DOCUMENTS

| | | |
|---|---|---|
| CA | 730561 A | 3/1966 |
| DE | 102019101374 A1 | 7/2020 |

(Continued)

OTHER PUBLICATIONS

International Search Report and Written Opinion for PCT Application No. PCT/US2023/031725, mailed Dec. 13, 2023, 12 pages.

*Primary Examiner* — Eugene G Byrd
(74) *Attorney, Agent, or Firm* — Abel Schillinger, LLP; Ann Palma (57) ABSTRACT

Embodiments described herein are generally directed to an annular seal including: an annular body defining a cross-section down a central axis, the annular body including: a first linear section oriented down a first plane; a first portion contiguous with the first end of the first linear section, the first portion being curved with respect to the first linear section and in accordance with a first predetermined radius, the first portion extending to a first distal end; a second portion contiguous with the second end of the first linear section, the second portion including: a second linear section oriented down a second plane non-parallel to the first plane; and at least one discrete, radially-oriented tab contiguous with the second linear section and oriented along a circumference of the annular body.

20 Claims, 4 Drawing Sheets

(56) References Cited

U.S. PATENT DOCUMENTS

| | | | |
|---|---|---|---|
| 4,336,943 A * | 6/1982 | Chaplin | F16L 23/20 |
| | | | 415/113 |
| 4,477,086 A * | 10/1984 | Feder | F16J 15/0887 |
| | | | 415/113 |
| 5,240,263 A * | 8/1993 | Nicholson | F16J 15/0893 |
| | | | 219/137 R |
| 5,249,814 A | 10/1993 | Halling | |
| 5,505,498 A * | 4/1996 | Halling | F16L 27/06 |
| | | | 285/379 |
| 5,947,479 A | 9/1999 | Ostrowski | |
| 6,302,402 B1 * | 10/2001 | Rynders | F28F 21/04 |
| | | | 277/653 |
| 6,568,692 B2 | 5/2003 | Kolodziej et al. | |
| 6,983,940 B2 | 1/2006 | Halling | |
| 7,837,233 B2 | 11/2010 | Johnston et al. | |
| 8,152,172 B2 | 4/2012 | Halling | |
| 9,115,585 B2 * | 8/2015 | Melton | F01D 9/023 |
| 9,169,930 B2 | 10/2015 | Panchal et al. | |
| 9,506,588 B2 | 11/2016 | Cronin et al. | |
| 2002/0121747 A1 | 9/2002 | Kolodziej et al. | |
| 2008/0012296 A1 * | 1/2008 | Johnston | F16L 27/1275 |
| | | | 285/224 |
| 2008/0053107 A1 * | 3/2008 | Weaver | F02C 7/28 |
| | | | 415/138 |
| 2010/0259016 A1 | 10/2010 | Halling | |
| 2013/0068113 A1 | 3/2013 | Chameroy et al. | |
| 2018/0017168 A1 * | 1/2018 | Davis | F01D 11/005 |
| 2021/0199197 A1 | 7/2021 | Armitage et al. | |

FOREIGN PATENT DOCUMENTS

| | | | | |
|---|---|---|---|---|
| EP | 0485160 A1 | 5/1992 | | |
| FR | 2955166 B1 * | 3/2012 | | A47J 27/08 |
| FR | 3059301 A1 | 6/2018 | | |
| GB | 2087501 A | 5/1982 | | |
| GB | 2129505 A | 5/1984 | | |
| JP | 2022054631 A | 4/2022 | | |
| KR | 100370447 B1 | 1/2003 | | |
| WO | 2006085853 A1 | 8/2006 | | |
| WO | WO-2014120310 A2 * | 8/2014 | | F01D 11/005 |

* cited by examiner

SEAL AND METHOD OF USING AND MAKING THE SAME

CROSS-REFERENCE TO RELATED APPLICATION(S)

This application claims priority under 35 U.S.C. § 119(e) to U.S. Provisional Application No. 63/374,041, entitled "SEAL AND METHOD OF USING AND MAKING THE SAME," by Mark W. ARMITAGE et al., filed Aug. 31, 2022, which is assigned to the current assignee hereof and incorporated herein by reference in its entirety.

FIELD OF THE DISCLOSURE

The present invention generally relates to annular seals.

BACKGROUND

Traditional seals, such as axial c-ring seals and other lip seals are suitable for sealing between two approximately concentric tubular members in seal assemblies housing fluids. The sealing interface is typically generated by interference fits between the seal and the neighboring tubular members, such as neighboring components in fluid assemblies such as, but not limited to, high temperature automotive exhaust assemblies. Often, these neighboring components, such as bellows and exhaust manifolds, may be complicated, expensive, and difficult to install. Further, thermal, mechanical, and vibrational forces can cause deformation of the seal and/or relative misalignment and displacement between the seal and one or both tubular members during operation. This relative displacement can result in wear, uneven retention, leakage of fluid, and eventual failure in one or more of the tubular members and/or the seal, thereby requiring special and costly repairs. Therefore, there continues to be a need for improved seal designs.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the seal and seal assembly arts.

Embodiments described herein are generally directed to an annular seal including: an annular body defining a cross-section down a central axis, the annular body including: a first linear section oriented down a first plane; a first portion contiguous with the first end of the first linear section, the first portion being curved with respect to the first linear section and in accordance with a first predetermined radius, the first portion extending to a first distal end; a second portion contiguous with the second end of the first linear section, the second portion including: a second linear section oriented down a second plane non-parallel to the first plane; and at least one discrete, radially-oriented tab contiguous with the second linear section and oriented along a circumference of the annular body.

Embodiments described herein are generally directed to an annular seal including: an annular body defining a cross-section down a central axis, the annular body including: a first linear section oriented down a first plane, the first linear section consisting of a first end and a second end, where the first linear section does not have any inflection points formed therein; a first portion contiguous with the first end of the first linear section, the first portion being curved with respect to the first linear section and in accordance with a first predetermined radius, the first portion extending to a first distal end; a second portion contiguous with the second end of the first linear section, the second portion including: a curved portion that is contiguous with the second end of the first linear section, the curved portion being curved with respect to the first linear section and in accordance with a second predetermined radius; a second linear section contiguous with the curved portion such that the curved portion is between the first linear section and the second linear section, where the second linear section is oriented down a second plane non-parallel to the first plane; and where the annular body further includes at least one discrete, radially-oriented tab contiguous with the second linear section and oriented along a circumference of the annular body and extending to a second distal end.

Embodiments described herein are generally directed to an assembly including: an outer member; an inner member; and an annular seal disposed radially between the outer member and the inner member, the seal including: an annular body defining a cross-section down a central axis, the annular body including: a first linear section oriented down a first plane; a first portion contiguous with the first end of the first linear section, the first portion being curved with respect to the first linear section and in accordance with a first predetermined radius, the first portion extending to a first distal end; a second portion contiguous with the second end of the first linear section, the second portion including: a second linear section oriented down a second plane non-parallel to the first plane; and at least one discrete, radially-oriented tab contiguous with the second linear section and oriented along a circumference of the annular body and extending to a second distal end.

Embodiments described herein are generally directed to an annular seal including: an annular body defining a cross-section down a central axis, the annular body including: a first linear section oriented down a first plane; a first portion contiguous with the first end of the first linear section, the first portion being curved with respect to the first linear section and in accordance with a first predetermined radius, the first portion extending to a first distal end; a second portion contiguous with the second end of the first linear section, the second portion including: a curved portion that is contiguous with the second end of the first linear section, the curved portion being curved with respect to the first linear section and in accordance with a second predetermined radius; and a second linear section contiguous with the curved portion such that the curved portion is between the first linear section and the second linear section, where the second linear section is oriented down a second plane non-parallel to the first plane and extends to a second distal end.

Figure 1A:
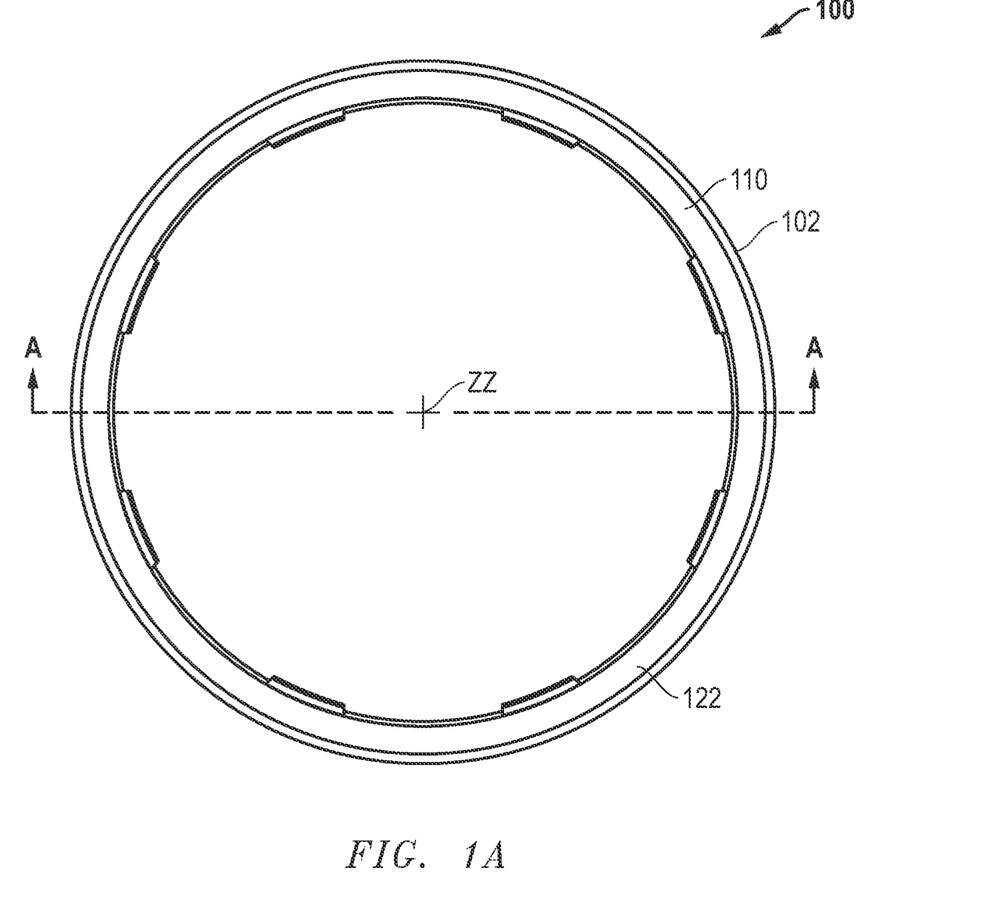
FIG. 1A is a plan view of a seal in accordance with a number of embodiments.
Figure 1B:
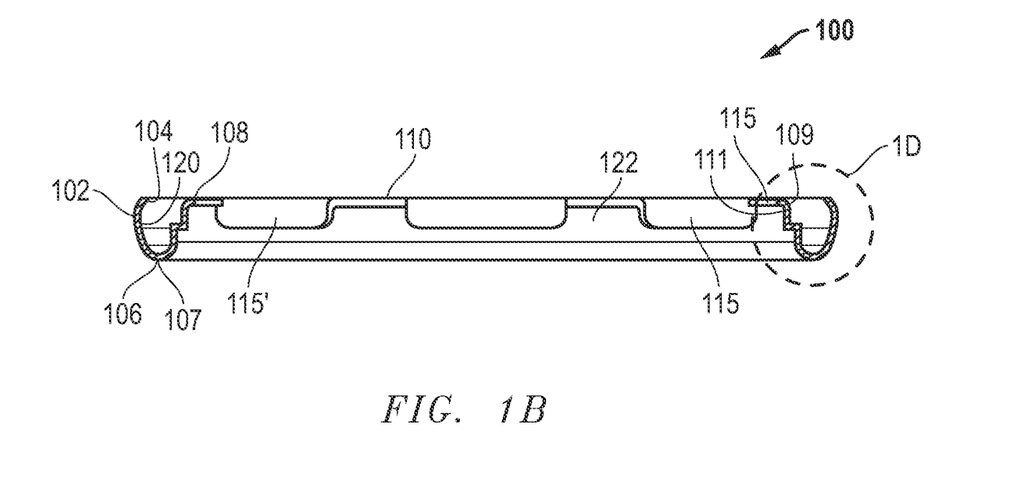
FIG. 1B is a cross-sectional view, in longitudinal section, taken along line A-A of the seal of FIG. 1A.
Figure 1C:
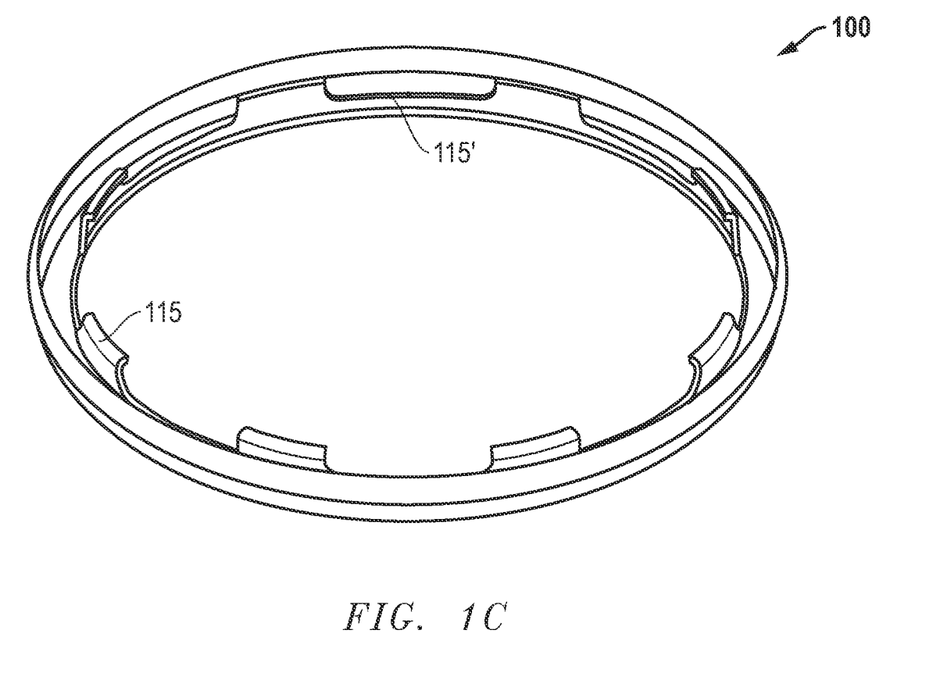
FIG. 1C is an enlarged view of a portion of the view of the seal shown in FIG. 1B.
Figure 1D:
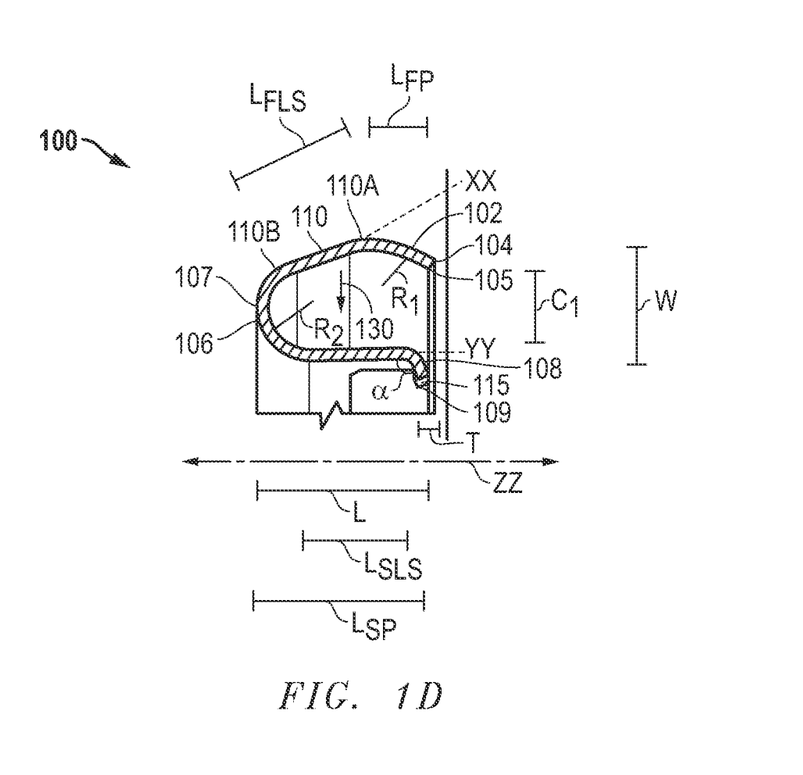
FIG. 1D is a perspective view of the seal shown in FIG. 1A.

Referring to FIGS. 1A-1D, there are shown various views of a seal in accordance with a number of embodiments. FIG. 1A is a plan view of a seal in accordance with a number of embodiments. FIG. 1B is a cross-sectional view, in longitudinal section, taken along line A-A of the seal of FIG. 1A. FIG. 1C is an enlarged view of a portion of the view of the seal shown in FIG. 1B. FIG. 1D is a perspective view of the seal shown in FIG. 1A. In a number of embodiments, the seal 100 has a substantially annular shape and has a predetermined degree of resiliency. In a number of embodiments, the seal 100 has a generally hook-shaped cross-section. In a number of embodiments, as shown in FIG. 1A, the seal 100 has a substantially annular shape or annular body 101 defining a cross-section down a central axis ZZ. In an embodiment, the annular body 101 of the seal 100 may have first side 120 and opposite second side 122. In a number of embodiments, as shown best in FIG. 1D, the annular body 101 of the seal 100 may include a first linear section 110. The first linear section 110 may be oriented down a first plane XX. In a number of embodiments, the first linear section 110 may be frustoconical. In a preferred embodiment, first linear section 110 is configured so that it does not have any inflection points formed therein. In a number of embodiments, the first linear section 110 may have a first end 110A and a second end 110B. In a number of embodiments, the annular body 101 of the seal 100 may further include a first portion 102. The first portion 102 may be contiguous with the first end 110A of the first linear section 110. The first portion 102 may be curved with respect to the first linear section 110 and in accordance with a first predetermined radius, $R_1$. In a number of embodiments, the first portion 102 may define a first distal end 104 of the seal 100. This distal end 104 may define a first edge 105. Referring to FIG. 1D, in one embodiment, first edge 105 and/or distal end 104 may be slightly angulated in first direction 130 with respect to the first plane XX. In a number of embodiments, the annular body 101 of the seal 100 may further include a second portion 106. The second end portion 106 may be contiguous with the second end 110B of the first linear section 110. In this way, in a number of embodiments, the first linear section 110 may be between and contiguous with the first portion 102 and the second portion 106. In a number of embodiments, the second portion 106 may include a curved portion 107. The curved portion 107 may be curved with respect to the first linear section 110 and in accordance with a second predetermined radius, $R_2$. In a number of embodiments, the second portion 106 curls in a first direction 130 in accordance with a predetermined radius, $R_2$, of curved portion 107 such that distal end 108 may be located across from first side 120 by a predetermined distance, $C_1$, and distal ends 104 and 108 do not face each other. In a number of embodiments, the second portion 106 may further include a second linear section 111 contiguous with the curved portion 107 such that the curved portion 107 may be between the first linear section 110 and the second linear section 111. In an embodiment, the second linear section 111 may extend to a second distal end 108. The second distal end 108 may define a second edge 109. In a preferred embodiment, the second linear section 111 may be configured so that it does not have any inflection points formed therein. In a number of embodiments, the second linear section 111 may be oriented down a second plane YY that may be non-parallel to the first plane XX.

Still referring to FIGS. 1A-1D, in a number of embodiments, the annular body 101 of the seal 100 may further include at least one discrete, radially-oriented tab 115. In a number of embodiments, the at least one radially-oriented tab 115 may include a plurality of discrete, radially-oriented tabs 115, 115'. In a number of embodiments, the at least one radially-oriented tab 115 may be contiguous with the second linear section 110. In a number of embodiments, the at least one radially-oriented tab 115 may be oriented along the circumference of the annular body 101. In these embodiments, the at least one radially-oriented tab 115 may extend to the second distal end 108. As stated above, the second distal end 108 may define a second edge 109. In one embodiment, the at least one radially-oriented tab 115 and/or second distal end 108 may be slightly angulated in the first direction 130 with respect to the second plane YY. In a number of embodiments, as shown best in FIGS. 1B-1C, the at least one radially-oriented tab 115 may be oriented substantially perpendicular to the central axis ZZ. In a number of embodiments, the at least one radially-oriented tab 115 may form an angle, α, with the central axis ZZ, where a is between 75° and 135°. As shown best in FIG. 1C, the plurality of radial tabs 115, 115' may be located on the radial interior of the annular body 101. Alternatively, the plurality of radial tabs 115, 115' may be located on the radial exterior of the annular body 101.

Referring back to FIG. 1A, the annular body 101 of the seal 100 may have an outer diameter D1 and inner diameter D2. In this particular embodiment, first portion 102 defines an outer diameter D1 and the at least one radially-oriented tab 115 defines an inner diameter D2. In another embodiment, first portion 102 defines an inner diameter D2 and the at least one radially-oriented tab 115 defines an outer diameter D1. As shown in FIGS. 1A and 1D, the annular body 101 of the seal 100 may have outer diameter D1, inner diameter D2, radial width W and height H. In this particular embodiment, the interior of curved portion 107 defines inner diameter D2. In a number of embodiments, the annular body 101 of the seal 100 may have a thickness T.

Still referring back to FIG. 1A, in an embodiment, the seal 100 may have an overall outer diameter, D1. For purposes of embodiments described herein, the outer diameter, D1, of the seal 100 may be at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. According to still other embodiments, outer diameter, D1, of the seal 100 may be no greater than 5000 mm, no greater than 4000 mm, no greater than 3000 mm, no greater than 2000 mm, no greater than 1500 mm, no greater than 1000 mm. It will be appreciated that outer diameter, D1, of the seal 100 may be within a range between any of the minimum and maximum values noted above. It will be further appreciated that outer diameter, D1, of the seal 100 may be any value between any of the minimum and maximum values noted above. It can also be appreciated that outer diameter, D1, of the seal 100 may vary along its circumference.

Still referring back to FIG. 1A, in an embodiment, the seal 100 may have an overall inner diameter, D2. For purposes of embodiments described herein, the inner diameter, D2, of the seal 100 may be at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. According to still other embodiments, inner diameter, D2, of the seal 100 may be no greater than 5000 mm, no greater than 4000 mm, no greater than 3000 mm, no greater than 2000 mm, no greater than 1500 mm, no greater than 1000 mm. It will be appreciated that inner diameter, D2, of the seal 100 may be within a range between any of the minimum and maximum values noted above. It will be further appreciated that inner diameter, D2, of the seal 100 may be any value between any of the minimum and maximum values noted above. It can also be appreciated that inner diameter, D2, of the seal 100 may vary along its circumference.

Referring back to FIG. 1D, the seal 100 may have a length, L, of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The seal 100 may have a length, L, that may be no greater than 5000 mm, no greater than 4000 mm, no greater than 3000 mm, no greater than 2000 mm, no greater than 1500 mm, no greater than 1000 mm. It will be further appreciated that the seal 100 may have a length, L, that may be any value between any of the minimum and maximum values noted above. It can also be appreciated that the seal 100 may have a length, L, that may vary along its circumference.

Still referring to FIG. 1D, in an embodiment, the seal 100 may have a width, W, of at least 0.1 mm, at least 1 mm, at least 5 mm, at least 10 mm, at least 25 mm, at least 50 mm, at least 75 mm, or at least 100 mm. The seal 100 may have a width, W, that may be no greater than 500 mm, no greater than 400 mm, no greater than 300 mm, no greater than 200 mm, no greater than 150 mm, no greater than 100 mm, no greater than 50 mm, no greater than 25 mm, no greater than 10 mm. It will be further appreciated that the seal 100 may have a width, W, that may be any value between any of the minimum and maximum values noted above. It can also be appreciated that the seal 100 may have a width, W, that may vary along its circumference.

Still referring to FIG. 1D, in an embodiment, the seal 100 may have a thickness, T, of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The seal 100 may have a thickness, T, that may be no greater than 5000 mm, no greater than 4000 mm, no greater than 3000 mm, no greater than 2000 mm, no greater than 1500 mm, no greater than 1000 mm. It will be further appreciated that the seal 100 may have a thickness, T, that may be any value between any of the minimum and maximum values noted above. It can also be appreciated that the seal 100 may have a thickness, T, that may vary along its circumference.

In an embodiment, the seal 100 has a length, L, and a width, W, and where L≥W, such as L≥1.2 W, such as L≥1.5 W, such as L≥2 W, such as L≥2.5 W, or such as L≥3 W. In an embodiment, first linear section has a length, $L_{FLS}$, and the second linear section has a length, $L_{SLS}$, and where $L_{FLS} \geq L_{SLS}$, such as $L_{FLS} \geq 1.2\ L_{SLS}$, such as $L_{FLS} \geq 1.5\ L_{SLS}$, such as $L_{FLS} \geq 2\ L_{SLS}$, such as $L_{FLS} \geq 2.5\ L_{SLS}$, or such as $L_{FLS} \geq 3\ L_{SLS}$. In an embodiment, the first portion has a length, $L_{FP}$, and the second linear section has a length, $L_{SLS}$, and where $L_{FP} \geq L_{SLS}$, such as $L_{FP} \geq 1.2\ L_{SLS}$, such as $L_{FP} \geq 1.5\ L_{SLS}$, such as $L_{FP} \geq 2\ L_{SLS}$, such as $L_{FP} \geq 2.5\ L_{SLS}$, or such as $L_{FP} \geq 3\ L_{SLS}$. In an embodiment, the first portion has a length, $L_{FP}$, and the second portion has a length, $L_{SP}$, and where $L_{SP} \geq L_{FP}$, such as $L_{SP} \geq 1.2\ L_{FP}$, such as $L_{SP} \geq 1.5\ L_{FP}$, such as $L_{SP} \geq 2\ L_{FP}$, such as $L_{SP} \geq 2.5\ L_{FP}$, or such as $L_{SP} \geq 3\ L_{FP}$.

In a number of embodiments, the size of seal 100 can be varied in order to be used in various applications. For example, in one embodiment, outer diameter D1 is between 12 and 100 mm, inner diameter D2 is between 10 and 90 mm, radial width W is between 2.3 mm and 6.4 mm and length L is between 1.5 mm and 12.5 mm. It is to be understood that seal 100 can be configured to have other dimensions. The actual dimensions depend upon the particular application in which the seal will be used.

Still referring back to FIG. 1D, in an embodiment, the first portion 102 may be curved to have a radius of curvature, $R_1$. In a number of embodiments, the first portion 102 may be curved to have a radius of curvature, $R_1$, that may be positive. In a number of embodiments, the first portion 102 may be curved to have a radius of curvature, $R_1$, that may be greater than 0.1, such as greater than 0.5, such as greater than 1, such as greater than 2, such as greater than 5, such as greater than 10, such as greater than 20, such as greater than 25, such as greater than 50, such as greater than 100, or such as greater than 200. In a number of embodiments, the first portion 102 may be curved to have a radius of curvature, $R_1$, that may be negative. In a number of embodiments, the first portion 102 may be curved to have a radius of curvature, $R_1$, that may be less than −0.1, such as less than −0.5, such as less than −1, such as less than −2, such as less than −5, such as less than −10, such as less than −20, such as less than −25, such as less than −50, such as less than −100, or such as less than −200. It will be further appreciated that the first portion 102 may be curved to have a radius of curvature, $R_1$, that may be any value between any of the minimum and maximum values noted above. It can also be appreciated that the first portion 102 may be curved to have a radius of curvature, $R_1$, that may vary along its circumference and length.

In some embodiments, the first portion 102 may form a curved portion that spans an arc of at least about 90 degrees, such as at least 135 degrees, or at least about 180 degrees. In some embodiments, the first portion 102 may form a curved portion that spans an arc of not greater than 270 degrees, such as not greater than 225 degrees, or not greater than about 180 degrees. Further, it will be appreciated that the first portion 102 may form a curved portion that spans an arc between any of these minimum and maximum percentages, such as at least about 90 degrees to not greater than about 270 degrees.

Still referring back to FIG. 1D, in an embodiment, the curved portion 107 may be curved to have a radius of curvature, $R_2$. In a number of embodiments, the curved portion 107 may be curved to have a radius of curvature, $R_2$, that may be positive. In a number of embodiments, the curved portion 107 may be curved to have a radius of curvature, $R_2$, that may be greater than 0.1, such as greater than 0.5, such as greater than 1, such as greater than 2, such as greater than 5, such as greater than 10, such as greater than 20, such as greater than 25, such as greater than 50, such as greater than 100, or such as greater than 200. In a number of embodiments, the curved portion 107 may be curved to have a radius of curvature, $R_2$, that may be negative. In a number of embodiments, the curved portion 107 may be curved to have a radius of curvature, $R_2$, that may be less than −0.1, such as less than −0.5, such as less than −1, such as less than −2, such as less than −5, such as less than −10, such as less than −20, such as less than −25, such as less than −50, such as less than −100, or such as less than −200. It will be further appreciated that the curved portion 107 may be curved to have a radius of curvature, $R_2$, that may be any value between any of the minimum and maximum values noted above. It can also be appreciated that the curved portion 107 may be curved to have a radius of curvature, $R_2$, that may vary along its circumference and length.

In some embodiments, the curved portion 107 may form a curved portion that spans an arc of at least about 90 degrees, such as at least 135 degrees, or at least about 180 degrees. In some embodiments, the curved portion 107 may form a curved portion that spans an arc of not greater than 270 degrees, such as not greater than 225 degrees, or not greater than about 180 degrees. Further, it will be appreciated that the curved portion 107 may form a curved portion that spans an arc between any of these minimum and maximum percentages, such as at least about 90 degrees to not greater than about 270 degrees.

In some embodiments, $R_1$ may be greater than $R_2$. In other embodiments, $R_1$ may be equal to $R_2$. However, in alternative embodiments, $R_1$ may be less than $R_2$. In some embodiments, $R_1$ may be greater than or less than $R_2$ by at least about 5%, such as at least 10%, at least 15%, at least 20%, at least 25%, at least 30%, at least 35%, at least 40%, at least 45%, at least 50%, at least 55% as at least 60%, at least 65%, at least 70%, at least 75%, at least 80%, at least 85%, at least 90%, at least 95%, at least 100%, at least 150%, at least 200%, at least 300%, at least 400%, at least 500%, at least 1000%, or at least about 2000%. In some embodiments, $R_1$ may be greater than or less than $R_2$ by not greater than about 2000%, not greater than 1000%, not greater than 500%, not greater than 400%, not greater than 300%, not greater than 200%, not greater than 100%, not greater than 95%, not greater than 90%, not greater than 85%, not greater than 80%, not greater than 75%, not greater than 70%, not greater than 65%, not greater than 60%, not greater than 55%, not greater than 50%, not greater than 45%, not greater than 40%, not greater than 35%, not greater than 30%, not greater than 25%, not greater than 20%, not greater than 15%, not greater than 10%, or not greater than about 5%. Further, it will be appreciated that $R_1$ may be greater than or less than $R_2$ by between any of these minimum and maximum percentages, such as at least about 5% to not greater than about 2000%.

In some embodiments, the seal 100 can at least partially include a metal. According to certain embodiments, the metal may include iron, copper, titanium, tin, aluminum, alloys thereof, or may be another type of material. More particularly, the seal 100 can at least partially include a steel, such as, a stainless steel, carbon steel, or spring steel. For example, the seal 100 can at least partially include a 301 stainless steel. The 301 stainless steel may be annealed, ¼ hard, ½ hard, ¾ hard, or full hard. The seal 100 may include a woven mesh or an expanded metal grid. Alternatively, the woven mesh can be a woven polymer mesh. In an alternate embodiment, the seal 100 may not include a mesh or grid. According to certain embodiments, the metal may include iron, copper, titanium, tin, aluminum, cobalt, nickel, alloys thereof, combinations thereof, or may be another type of material. In a particular embodiment, the seal 100 may include Inconel 718 or X750, Nickel alloys such as A286, Cobalt alloys such as Haynes 282, or Titanium alloys. More particularly, the seal 100 can at least partially include a steel, such as, a stainless steel, carbon steel, or spring steel. For example, the seal 100 can at least partially include a 301 stainless steel. The 301 stainless steel may be annealed, ¼ hard, ½ hard, ¾ hard, or full hard. The seal 100 may include a woven mesh or an expanded metal grid. In an alternate embodiment, the seal 100 may not include a mesh or grid. In an embodiment, the seal 100 may be fabricated from a ductile, corrosion-resistant, high-strength metal.

In an embodiment, the seal 100 may include a polymer which may be selected from the group including a polyketone, a polyaramid, a polyphenylene sulfide, a polyethersulfone, a polyphenylene sulfone, a polyamideimide, ultra high molecular weight polyethylene, a fluoropolymer, a polybenzimidazole, a polyacetal, polybutylene terephthalate (PBT), polypropylene (PP), polycarbonate (PC), Acrylonitrile butadiene styrene (ABS), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In a particular embodiment, the seal 100 can at least partially include, or even consist essentially of, a fluoropolymer. Exemplary fluoropolymers include a polytetrafluoroethylene (PTFE), a polyether ether ketone (PEEK), a polyimide (PI), a polyamide-imide (PAI), a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Other fluoropolymers, polymers, and blends may be included in the composition of the seal 100. In another particular embodiment, the seal 100 can at least partially include, or even consist essentially of, a polyethylene (PE) such as an ultra-high-molecular-weight polyethylene (UHMWPE). In a particular embodiment, the seal 100 may include or consist entirely of polyetheretherketone (PEEK).

In an embodiment, the seal 100 may include a ceramic which may be selected from the group including a glass filler, silica, clay mica, kaolin, lithium soap, graphite, boron nitride, molybdenum disulfide, tungsten disulfide, polytetrafluoroethylene, carbon nitride, tungsten carbide, or diamond like carbon.

In an embodiment, the seal 100 may be formed or fabricated from composite materials including combinations of any materials disclosed above. In a certain aspect, the seal 100 can be formed from a monolithic construction. In another aspect, the seal 100 can be formed from multiple components joined together by any means recognizable in the art, such as, for example, by mechanical deformation (e.g., crimping or splines), adhesive, welding, melting, or any combination thereof.

In a number of embodiments, the seal 100 may include a coating or lubricant. The lubricant may include a grease including at least one of lithium soap, lithium disulfide, graphite, mineral or vegetable oil, silicone grease, fluoroether-based grease, apiezon, food-grade grease, petrochemical grease, or may be a different type. The lubricant may include an oil including at least one of a Group I-Group III+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based, or may be a different type. In an embodiment, the lubricant may include Tungsten Disulfide, Molybdenum Disulfide, hexagonal boron nitride, lubricating plating such as NCCM, or deposited coatings deposited by physical vapor disposition which could be AlTiN, TiN, AlTiNCrN or other such coatings. Further, generally, an assembly as described herein can include a lubricant, including the lubricants listed above.

Figure 2A:
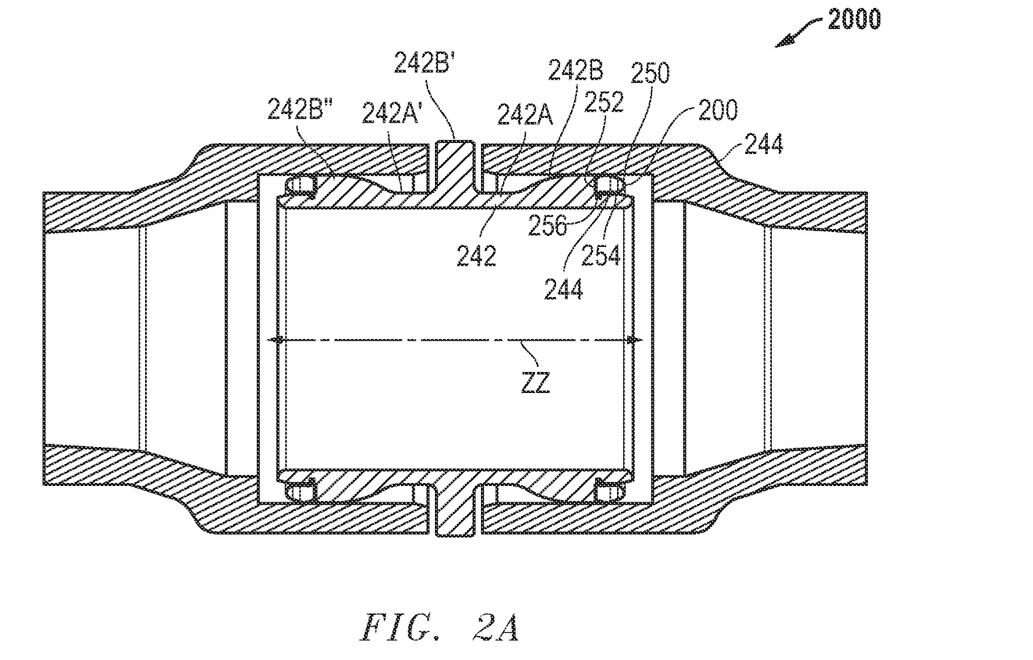
FIG. 2A is a cross-sectional view of the seal of FIG. 1A within an assembly in accordance with a number of embodiments.
Figure 2B:
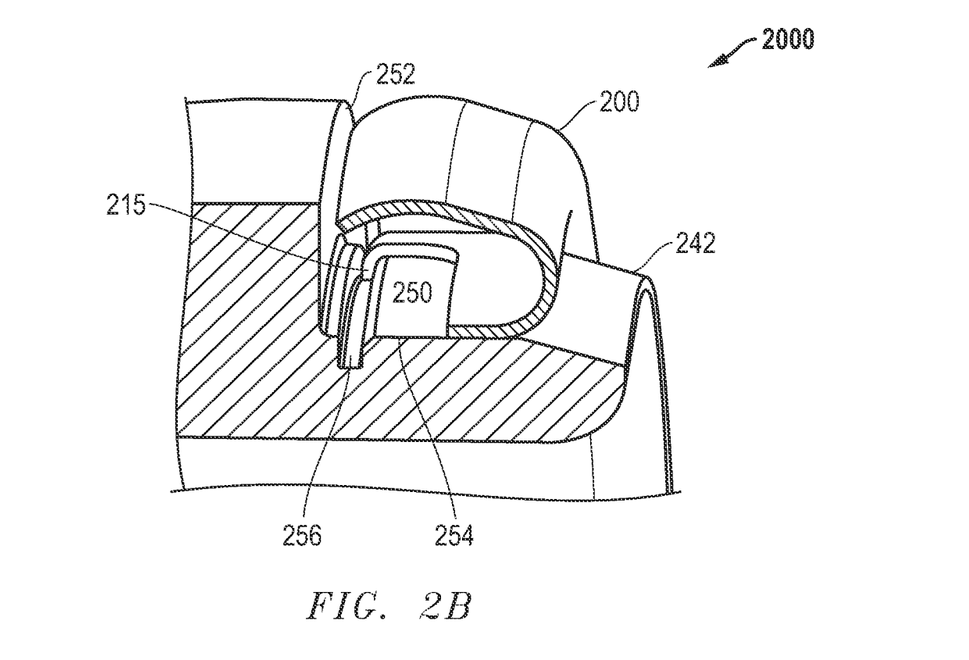
FIG. 2B is a top perspective view of the seal of FIG. 1A within an assembly in accordance with a number of embodiments.
Figure 2C:
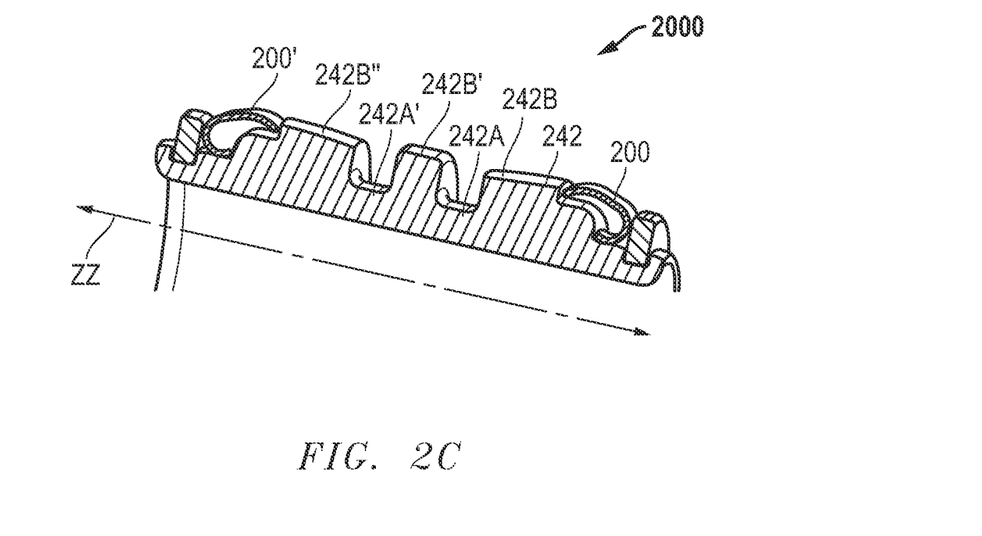
FIG. 2C is a cross-sectional view of the seal of FIG. 1A within an assembly in accordance with a number of embodiments.
Figure 2D:
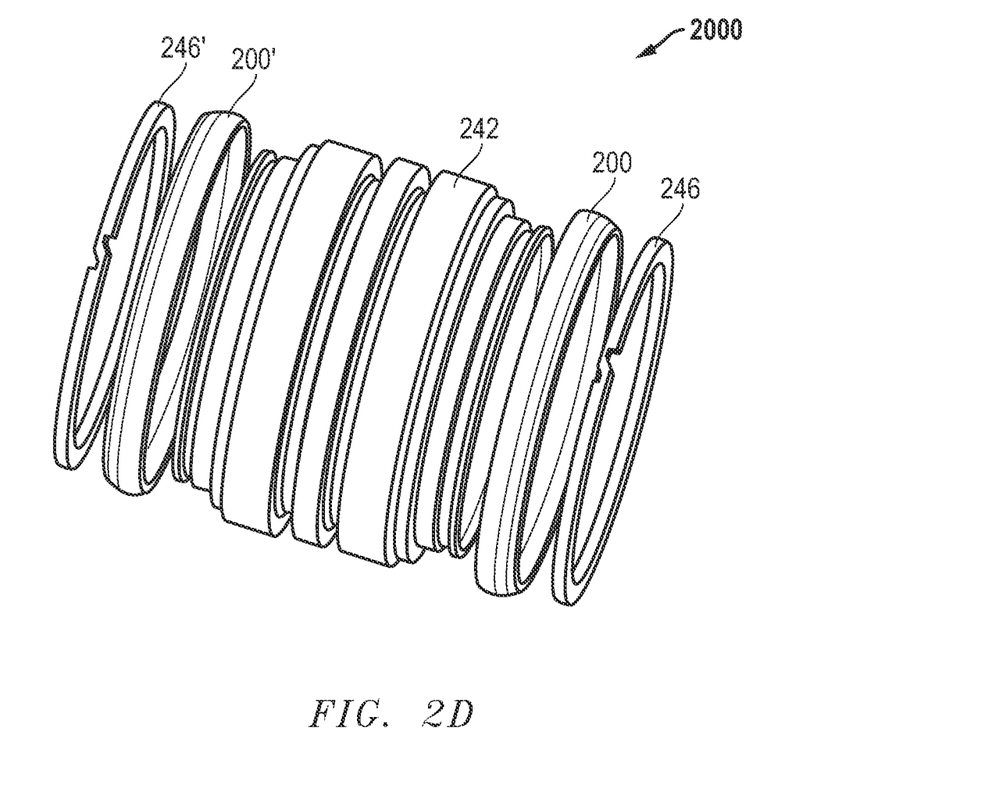
FIG. 2D is a side exploded view of the seal of FIG. 1A within an assembly in accordance with a number of embodiments.

Referring to FIGS. 2A-2D, there are shown various views of a seal within an assembly in accordance with a number of embodiments. FIG. 2A is a cross-sectional view of the seal of FIG. 1A within an assembly in accordance with a number of embodiments. FIG. 2B is a top perspective view of the seal of FIG. 1A within an assembly in accordance with a number of embodiments. FIG. 2C is a cross-sectional view of the seal of FIG. 1A within an assembly in accordance with a number of embodiments. FIG. 2D is a side exploded view of the seal of FIG. 1A within an assembly in accordance with a number of embodiments. Referring to FIGS. 2A-2D, there are shown various views of a seal within an assembly in accordance with a number of embodiments. In these Figures, the elements identical or similar to those described in connection with FIGS. 1A-1D are designated by the same reference number incremented by 200, and are not described again thereafter. As shown in FIG. 2A, the seal 200 may be disposed radially between neighboring components such as an inner member 242 and/or an outer member 244 within an assembly 2000 down a central axis ZZ. The inner member 242 and the outer member 244 may be in a confronting relationship. In some embodiments, the outer member 244 may include a substantially constant inner diameter. In some embodiments, the inner member 242 may include a substantially constant outer diameter. However, in some embodiments, the outer member 244 and/or the inner member 242 may include features that restrainably attach, locate, and/or receive portions of the seal 200 with respect to the outer member 244, inner member 242, or combinations thereof. In accordance with an embodiment of the invention, the seal 200 may be configured so that when the seal 200 is positioned within an assembly, the second linear section 211 may not be upstanding or vertical, but rather, may be in a somewhat general horizontal position, as described herein. For example, in an embodiment as shown, at least one of the inner member 242 or the outer member 244 may include a cavity 250 into which the seal 200 is positioned. For example, as shown in FIG. 2A, the inner member 242 may include a cavity 250 with a wall portion 252 and an outer surface 254. As shown in FIG. 2A, the intersection of the wall portion 252 and the outer surface 254 may include an annular groove 256. As shown best in FIG. 2B, the at least one radially-oriented tab 215 of the seal 200 may be restrainably housed within the groove 256 to prevent relative movement between the seal 200 and the inner member 242 and fix the annular seal 200 and the inner member 242 together. Depending on the configuration of the seal 200, the at least one radially-oriented tab 215 may be attached the inner member 242. Thus, in some embodiments, the at least one radially-oriented tab 215 may be restrainably attached to the inner and/or outer members 242, 244 via adhesive bonding, circlips, clips, fasteners, interference fit, other known restraining devices, or any combination thereof. It is contemplated herein that the outer member 244 may include the cavity 250 with the seal 200 attached or fixed thereto in an opposite configuration to FIGS. 2A-2B.

In some embodiments, the outer member 244 may include a substantially constant inner diameter. In some embodiments, the inner member 242 may include a substantially constant outer diameter. However, in some embodiments, the outer member 244 and/or the inner member 242 may include features that restrainably attach, locate, and/or receive portions of the annular seal 200 with respect to the outer member 244, inner member 242, or combinations thereof. For example, the outer member 244 may include an increased diameter portion that forms an outer groove in an inner surface of the outer member 244, and the inner member 242 may include a reduced diameter portion that forms an inner groove in an outer surface of the inner member 242. Accordingly, in some embodiments, the at least one radially-oriented tab 215 may be received and/or restrainably attached within the outer groove, and/or restrainably attached within the outer groove. Furthermore, in some particular embodiments, one or more additional restraining mechanisms, such as adhesive bonding, circlips, clips, fasteners, interference fit, other known restraining devices, or any combination thereof, may be used in conjunction with the grooves.

In some embodiments, as shown in FIGS. 2A and 2C, the assembly 2000 may include a plurality of seals 200, 200'. In an embodiment, the inner member may have a dog bone cross-section. The dog bone cross-section may include a plurality of grooves 242A, 242A' separating a plurality of plateaus 242B, 242B', 242B". In this way, multiple seals 200, 200' may be used to prevent fluid leakage along an assembly 2000. For example, as shown in FIG. 2D, the assembly 2000 may include multiple seals 200, 200' attached to a single inner member 242 and capped axially be a plurality of cap components 246, 246'.

In a number of embodiments, the seal 100, 200 may form an assembly which can be utilized in a bidirectional pressure application. The seal 100, 200 may be oriented and protect against leakage of fluid in a forward axial direction, or the seal 100, 200 may be oriented and protect against leakage of fluid in a backward axial direction down the central axis ZZ. The seal 100, 200 may be oriented and protect against leakage of fluid in an inward direction, or the seal 100, 200 may be oriented and protect against leakage of fluid in an outward direction in a direction perpendicular to the central axis ZZ. In this regard, the seal 100, 200 may be selected to have specific characteristics which permit effective sealing in those particular orientations. Other particularly suitable applications include valves, pistons, bidirectional couplings, and other movable components requiring sealing therebetween. Further, embodiments of an annular seal 100, 200 disclosed herein may be used in automotive, commercial, or industrial machinery and/or vehicles. For example, in an embodiment, the inner member 242 may be a pipe or tube for an exhaust assembly. In an embodiment, the outer member 244 may be a pipe or tube for an exhaust assembly. In some embodiments, the outer member 244 may include at least one of an exhaust component and an engine block, and the inner member 242 may include at least one of an exhaust component, exhaust manifold, and an EGR valve.

Use of the dog bone cross-section inner member 242 and/or the seal 100, 200 may provide increased benefits in several applications such as, but not limited to, seal assemblies housing fluids such as high temperature automotive exhaust assemblies or other types of applications. Notably, the use of the section inner member 242 and/or the seal 100, 200 by eliminating components and increasing ease of assembly. Further, use of the section inner member 242 and/or the seal 100, 200 may improve assembly forces required, compensate for axial tolerances and correct misalignment, and provide noise reduction and decoupling within the assembly 2000 by preventing undesired movement caused by thermal, mechanical, and vibrational forces. Further, the seal 100, 200 may be a simple installation and be retrofit, reusable, and cost effective across several possible assemblies of varying complexity. In many exhaust systems, bellows are often used to prevent exhaust fluid leakage between exhaust manifolds and exhaust gas recirculation coolers as flexible joints, however, bellows are often expensive, complicated to install, and often allow for misalignment and angularity. In a number of embodiments, use of at least one of the dog bone cross-section inner member 242 and/or the seal 100, 200 provides a cheaper solution to retrofit or even replace the bellows, allowing for an easier installation without sacrificing leakage prevention performance, thus increasing the lifetime of the assembly 2000.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: An annular seal comprising: an annular body defining a cross-section down a central axis, the annular body comprising: a first linear section oriented down a first plane; a first portion contiguous with the first end of the first linear section, the first portion being curved with respect to the first linear section and in accordance with a first predetermined radius, the first portion extending to a first distal end; a second portion contiguous with the second end of the first linear section, the second portion comprising: a second linear section oriented down a second plane non-parallel to the first plane; and at least one discrete, radially-oriented tab contiguous with the second linear section and oriented along a circumference of the annular body.

Embodiment 2: An annular seal comprising: an annular body defining a cross-section down a central axis, the annular body comprising: a first linear section oriented down a first plane, the first linear section consisting of a first end and a second end, wherein the first linear section does not have any inflection points formed therein; a first portion contiguous with the first end of the first linear section, the first portion being curved with respect to the first linear section and in accordance with a first predetermined radius, the first portion extending to a first distal end; a second portion contiguous with the second end of the first linear section, the second portion comprising: a curved portion that is contiguous with the second end of the first linear section, the curved portion being curved with respect to the first linear section and in accordance with a second predetermined radius; a second linear section contiguous with the curved portion such that the curved portion is between the first linear section and the second linear section, wherein the second linear section is oriented down a second plane non-parallel to the first plane; and wherein the annular body further comprises at least one discrete, radially-oriented tab contiguous with the second linear section and oriented along a circumference of the annular body and extending to a second distal end.

Embodiment 3: An assembly comprising: an outer member; an inner member; and an annular seal disposed radially between the outer member and the inner member, the seal comprising: an annular body defining a cross-section down a central axis, the annular body comprising: a first linear section oriented down a first plane; a first portion contiguous with the first end of the first linear section, the first portion being curved with respect to the first linear section and in accordance with a first predetermined radius, the first portion extending to a first distal end; a second portion contiguous with the second end of the first linear section, the second portion comprising: a second linear section oriented down a second plane non-parallel to the first plane; and at least one discrete, radially-oriented tab contiguous with the second linear section and oriented along a circumference of the annular body and extending to a second distal end.

Embodiment 4: The annular seal or assembly according to any of embodiments 1-3, wherein the annular seal has a generally hook-shaped cross-section.

Embodiment 5: The annular seal or assembly according to any of embodiments 1-3, wherein the at least one radially-oriented tab is oriented substantially perpendicular to the central axis.

Embodiment 6: The annular seal or assembly according to any of embodiments 1-3, wherein the at least one radially-oriented tab forms an angle, $\alpha$, with the central axis, wherein $\alpha$ is between 75° and 135°.

Embodiment 7: The annular seal or assembly according to any of embodiments 1-3, wherein the at least one radially-oriented tab comprises a plurality of radially-oriented tabs.

Embodiment 8: The assembly according to embodiment 3, wherein the at least one radially-oriented tab couples to the inner member to fix the annular seal and the inner member together.

Embodiment 9: The assembly according to embodiment 3, wherein the inner member comprises an annular groove, and wherein the at least one radially-oriented tab couples to the annular groove of the inner member to fix the annular seal and the inner member together.

Embodiment 10: The annular seal or assembly according to any of embodiments 1-3, wherein the annular seal is metallic.

Embodiment 11: The annular seal or assembly according to any of embodiments 1-3, wherein the annular seal is fabricated from a ductile, corrosion-resistant, high-strength metal.

Embodiment 12: The annular seal or assembly according to any of embodiments 1-3, wherein the annular seal is fabricated from polymer.

Embodiment 13: The annular seal or assembly according to any of embodiments 1-3, wherein the annular seal is fabricated from a ceramic.

Embodiment 14: The annular seal or assembly according to any of embodiments 1-3, wherein the annular seal is fabricated from composite materials.

Embodiment 15: The annular seal or assembly according to any of embodiments 1-3, wherein the first distal end is slightly angulated in a first direction.

Embodiment 16: The annular seal or assembly according to any of embodiments 1-3, wherein the second distal end is slightly angulated in a first direction.

Embodiment 17: The annular seal or assembly according to any of embodiments 1-3, wherein the annular seal has an inner diameter and an outer diameter, wherein the radially-oriented tab defines the outer diameter.

Embodiment 18: The annular seal or assembly according to any of embodiments 1-3, wherein the annular seal has an inner diameter and an outer diameter, wherein the radially-oriented tab defines the inner diameter.

Embodiment 19: The annular seal or assembly according to any of embodiments 1-3, wherein the annular body has a length, $L_{AB}$, and a width, $W_{AB}$, and wherein $L_{AB} \geq W_{AB}$, such as $L_{AB} \geq 1.2\ W_{AB}$, such as $L_{AB} \geq 1.5\ W_{AB}$, such as $L_{AB} \geq 2\ W_{AB}$, such as $L_{AB} \geq 2.5\ W_{AB}$, or such as $L_{AB} \geq 3\ W_{AB}$.

Embodiment 20: The annular seal or assembly according to any of embodiments 1-3, wherein the first linear section has a length, $L_{FLS}$, and the second linear section has a length, L SLS and wherein $L_{FLS} \geq L_{SLS}$, such as $L_{FLS} \geq 1.2\ L_{SLS}$, such as $L_{SLS} \geq 1.5\ L_{SLS}$, such as $L_{FLS} \geq 2\ L_{SLS}$, such as $L_{FP} \geq 2.5\ L_{SLS}$, or such as $L_{FP} \geq 3\ L_{SLS}$.

Embodiment 21: The annular seal or assembly according to any of embodiments 1-3, wherein the first portion has a length, $L_{FP}$, and the second linear section has a length, $L_{SLS}$ and wherein $L_{FP} \geq L_{SLS}$, such as $L_{FP} \geq 1.2\ L_{SLS}$, such as $L_{FP} \geq 1.5\ L_{SLS}$, such as $L_{FP} \geq 2\ L_{SLS}$, such as $L_{FP} \geq 2.5\ L_{SLS}$, or such as $L_{FP} \geq 3\ L_{SLS}$.

Embodiment 22: The annular seal or assembly according to any of embodiments 1-3, wherein the first portion has a length, $L_{FP}$, and the second portion has a length, $L_{SP}$, and wherein $L_{SP} \geq L_{FP}$, such as $L_{SP} \geq 1.2\ L_{FP}$, such as $L_{SP} \geq 1.5\ L_{FP}$, such as $L_{SP} \geq 2\ L_{FP}$, such as $L_{SP} \geq 2.5\ L_{FP}$, or such as $L_{SP} \geq 3\ L_{FP}$.

Embodiment 23: The annular seal or assembly according to any of embodiments 1-3, wherein the curved portion forms an open loop that spans an arc of at least about 90 degrees.

Embodiment 24: The annular seal or assembly according to any of embodiments 1-3, wherein the curved portion forms an open loop that spans an arc of greater than 90 degrees.

Embodiment 25: The annular seal or assembly according to any of embodiments 1-3, wherein the first portion has radius of curvature $R_1$, and wherein the curved portion has a radius of curvature, $R_2$, and wherein $R_1$ is less than $R_2$.

Embodiment 26: The assembly according to embodiment 3, wherein the outer member is a pipe for an exhaust assembly.

Embodiment 27: The assembly according to embodiment 3, wherein the inner member is a pipe for an exhaust assembly.

Embodiment 28: The assembly according to embodiment 27, wherein the inner member has a dog bone cross-section.

Embodiment 29: An annular seal comprising: an annular body defining a cross-section down a central axis, the annular body comprising: a first linear section oriented down a first plane; a first portion contiguous with the first end of the first linear section, the first portion being curved with respect to the first linear section and in accordance with a first predetermined radius, the first portion extending to a first distal end; a second portion contiguous with the second end of the first linear section, the second portion comprising: a curved portion that is contiguous with the second end of the first linear section, the curved portion being curved with respect to the first linear section and in accordance with a second predetermined radius; and a second linear section contiguous with the curved portion such that the curved portion is between the first linear section and the second linear section, wherein the second linear section is oriented down a second plane non-parallel to the first plane and extends to a second distal end.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. An annular seal comprising:
an annular body defining a cross-section down a central axis, the annular body comprising:
a first linear section oriented down a first plane;
a first portion contiguous with a first end of the first linear section, the first portion being curved with respect to the first linear section and in accordance with a first predetermined radius, the first portion extending to a first distal end;
a second portion contiguous with a second end of the first linear section, the second portion comprising:
a second linear section oriented down a second plane non-parallel to the first plane; and
at least a plurality of radially-oriented tabs contiguous with the second linear section and oriented along a circumference of the annular body, wherein the plurality of radially-oriented tabs are each discrete from one another and two neighboring radially-oriented tabs of the plurality of radially-oriented tabs are separated by circumferential gap.

2. An annular seal comprising:
an annular body defining a cross-section down a central axis, the annular body comprising:
a first linear section oriented down a first plane, the first linear section consisting of a first end and a second end, wherein the first linear section does not have any inflection points formed therein;
a first portion contiguous with the first end of the first linear section, the first portion being curved with respect to the first linear section and in accordance with a first predetermined radius, the first portion extending to a first distal end;
a second portion contiguous with the second end of the first linear section, the second portion comprising:
a curved portion that is contiguous with the second end of the first linear section, the curved portion being curved with respect to the first linear section and in accordance with a second predetermined radius;
a second linear section contiguous with the curved portion such that the curved portion is between the first linear section and the second linear section, wherein the second linear section is oriented down a second plane non-parallel to the first plane; and
wherein the annular body further comprises at least a plurality of radially-oriented tabs contiguous with the second linear section and oriented along a circumference of the annular body and extending to a second distal end, and wherein the plurality of radially-oriented tabs are each discrete from one another and two neighboring radially-rented tabs of the plurality of radially-oriented tabs are separated by circumferential gap.

3. An assembly comprising:
an outer member;
an inner member; and
an annular seal disposed radially between the outer member and the inner member, the seal comprising:
an annular body defining a cross-section down a central axis, the annular body comprising:
a first linear section oriented down a first plane;
a first portion contiguous with the first end of the first linear section, the first portion being curved with respect to the first linear section and in accordance with a first predetermined radius, the first portion extending to a first distal end;
a second portion contiguous with the second end of the first linear section, the second portion comprising:
a second linear section oriented down a second plane non-parallel to the first plane; and
at least a plurality of radially-oriented tabs contiguous with the second linear section and oriented along a circumference of the annular body and extending to a second distal end, and wherein the plurality of radially-oriented tabs are each discrete from one another and two neighboring radially-oriented tabs of the plurality of radially-oriented tabs are separated by circumferential gap.

4. The annular seal of claim 1, wherein the annular seal has a generally hook-shaped cross-section.

5. The annular seal of claim 1, wherein the plurality of radially-oriented tabs is oriented substantially perpendicular to the central axis.

6. The annular seal of claim 1, wherein the plurality of radially-oriented tabs form an angle $\alpha$, with the central axis, wherein $\alpha$ is between 75° and 135°.

7. The assembly of claim 3, wherein the plurality of radially-oriented tabs couple to the inner member to fix the annular seal and the inner member together.

8. The assembly of claim 3, wherein the inner member comprises an annular groove, and wherein the plurality of radially-oriented tabs couple to the annular groove of the inner member to fix the annular seal and the inner member together.

9. The annular seal of claim 1, wherein the first distal end is slightly angulated in a first direction.

10. The annular seal of claim 1, wherein the second distal end is slightly angulated in a first direction.

11. The annular seal of claim 1, wherein the annular seal has an inner diameter and an outer diameter, and wherein the plurality of radially-oriented tabs define the outer diameter.

12. The annular seal of claim 1, wherein the annular seal has an inner diameter and an outer diameter, and wherein the plurality of radially-oriented tabs define the inner diameter.

13. The annular seal of claim 1, wherein the annular body has a length, $L_{AB}$, and a width, $W_{AB}$, and wherein $L_{AB} \geq W_{AB}$.

14. The annular seal of claim 1, wherein the first linear section has a length, $L_{FLS}$, and the second linear section has a length, $L_{SLS}$, and wherein $L_{FLS} \geq L_{SLS}$.

15. The annular seal of claim 1, wherein the first portion has a length, $L_{FP}$, and the second linear section has a length, $L_{SLS}$, and wherein $L_{FP} \geq L_{SLS}$.

16. The annular seal of claim 1, wherein the first portion has a length, $L_{FP}$, and the second portion has a length, $L_{SP}$, and wherein $L_{SP} \geq L_{FP}$.

17. The annular seal of claim 2, wherein the curved portion forms an open loop that spans an arc of at least about 90 degrees.

18. The annular seal of claim 1, wherein the first portion has radius of curvature $R_1$, and wherein the curved portion has a radius of curvature, $R_2$, and wherein $R_1$ is less than $R_2$.

19. The assembly of claim 3, wherein the plurality of radially-oriented tabs are housed within an annular groove.

20. The assembly of claim 3, wherein the plurality of radially-oriented tabs are attached to the inner or outer member.

* * * * *